United States Patent Office 3,769,260
Patented Oct. 30, 1973

3,769,260
IMPACT-RESISTANT POLYETHYLENE TEREPHTHALATE COMPOSITIONS
Leon Segal, Morristown, N.J., assignor to Allied Chemical Corporation, New York, N.Y.
Filed June 13, 1972, Ser. No. 262,428
Int. Cl. C08d 9/10
U.S. Cl. 260—40 R          10 Claims

ABSTRACT OF THE DISCLOSURE

Thermoplastic molding compositions are prepared from a mixture of a linear saturated polyester and an α-olefin polymer or copolymer which has been terminally carboxylated by controlled oxidation. These mixtures are distinguished by increased impact strength, good dispersion of the olefin phase, and a high degree of stability and compatibility.

BACKGROUND OF THE INVENTION

Linear polyesters such as polyethylene terephthalate (PET) have been used in the past for fibers and films and more recently have found use as injection molding compounds, extrusions, stampable reinforced-sheet materials, and thermoformed objects. Its success in the former applications (fibers and films) have been due in part to the considerable improvement in properties obtained by stretching or extending the films and fibers whereby the polymer is obtained in an oriented, crystallized form of advantageous morphology. At the present time, however, products obtained by the latter techniques mentioned above have not been totally acceptable from a commercial viewpoint because they exhibit poor dimensional stability in the not totally crystallized form, and an unsatisfactory impact strength if totally crystallized after the product has been subjected to temperatures above approximately 100° C. for a prolonged period of time.

I have now developed a linear polyester composition which may be converted to shaped objects by injection molding, hot stamping, extrusion, or vacuum forming, and which shows an improved impact strength when crystallized.

The thermoplastic molding compositions, which are the object of this invention, are prepared from a mixture of (a) Linear saturated polyesters of aromatic dicarboxylic acids with saturated aliphatic or cycloaliphatic diols such as PET;

(b) From 0.5 to 30 percent based on total weight of a polymer or copolymer of ethylene which has been oxidized so as to introduce carboxylic acid groups onto the molecular chain ends at the points of chain scission. The ethylene polymer or copolymer is substantially insoluble in PET so as to form a discrete dispersed phase therein, and has a glass transition temperature below 0° C;

(c) Optionally, the mixture of (a) and (b) may be filled or reinforced with glass fibers, glass spheres, or particulate fillers of particle size less than 40 microns up to 70 percent of the total weight of the mixture.

The improvement of impact strengths of brittle polymer by incorporation of a well dispersed rubbery phase is not new to the art. Familiar examples are rubber-reinforced polystyrene and the ABS plastics. In both, a rubbery polymer is dispersed in a glassy matrix and significant increases in impact strengths are obtained, without decreases in modulus and heat distortion temperature, as would be obtained through ordinary internal or external plasticization.

The exact mechanism of impact property improvement is not known and may actually be a function of the constituents of the composite system. A recent theory has the rubbery inclusion acting as stress concentrators which provide sufficient local working and local heating upon shock impact to raise the local temperature in the vicinity of inclusions enough to initiate drawing of the glassy (matrix) phase. This theory is supported by the fact that micro-cracks or crazes obtained upon breakage of a polymer have been observed to be areas of highly oriented polymer interspersed by voids. The higher elongation and energy absorption of two-phase impact systems result from the drawing of the glassy phase to form a high percentage of the crazed material. Along with this effect, rubbery inclusions divert propagating cracks and form radiating micro-cracks so that the propagation of one large crack is not possible. Since more energy is dissipated in the formation and propagation of a multiplicity of micro-cracks than in the enlargement of an existing crack, the former (micro-cracking) process is, of course, preferable from the viewpoint of impact resistance.

Requirements which must be met for the above hypothetical mechanisms to be valid are (1) that the rubbery and glassy phases are bound strongly at the particle interface to prevent or minimize separation and void formation, (2) that the rubbery phase be present in particles large enough so that they exhibit typical rubbery properties, and (3) in sufficient number so that many sites are present at which the drawing process can be initiated. A too small particle size cannot be tolerated, since if the heterogeneity is reduced to molecular dimensions or if the two phases are mutually soluble, the result will be plasticization instead of the desired impact improvement, and a proceeding fracture will not be diverted from its straight course. The above discussion is presented for purpose of explanation and the theory discussed is not intended as a limitation on the scope of the present invention.

With respect to PET injection molding compositions, two-component impact-modified systems of this kind are known (see for example U.S. Pat. 3,405,198). In general, however, the incorporation of a rubbery olefinic phase has in the past resulted in phase separation and poor matrix-to inclusion adhesion. These problems become exceptionally pronounced if more than 2 to 4 percent of the total weight of the rubbery phase is incorporated. If unmodified polyethylene, for example, is dispersed by shear mixing into a PET matrix, a dispersion is obtained which upon heating to 200–280° C. segregates into a two-phase system, with large regions of polyethylene being ultimately surrounded by a single-phase PET matrix, as will be shown in the examples.

To overcome this problem, the olefinic phase is sometimes co-polymerized so as to change its character by yielding reactive groups in the polymer chain or backbone (U.S. Pats. 3,435,093 and 3,578,729). These reactive groups can often be reacted by means of polyfunctional compounds with the —COOH and/or —OH end groups of the PET polymer (see B.P. 1,208,585). In such systems, however, the polyfunction or reactive compounds often ultimately degrade the PET if care is not taken to precisely control the reaction conditions.

SUMMARY OF THE INVENTION

It is an object of this invention to obtain impact-resistant PET blends through the use of a high molecular weight α-olefin, such as polyethylene or copolymers of polyethylene. It is another and more particular object of this invention to yield PET polyblends which do not segregate under exposure to elevated temperatures. It is another object of this invention to yield polyblends of PET and a α-olefin which are reinforced with suitable fibrous and/or particulate fillers. It is a further object of this invention to yield "hot-stamped" reinforced structures of improved impact strength and improved phase stability. It is still another object of this invention to yield improved impact resistant PET compositions even at relatively low molecular weights of PET.

BRIEF DESCRIPTION OF THE DRAWING

The compositions depicted in the enlarged photographs of FIG. 1 to FIG. 9 illustrate polymer blends, including the unmodified polyester (PET) control which have been melt blended at 285° C. in a Brabender Plasticorder at an average shear rate of roughly 100 sec.$^{-1}$ for 6 minutes. Referring to the figures.

DESCRIPTION OF THE PREFERRED EMBODIMENTS

Figure 1:
FIG. 1 is a photomicrograph of the polyester (PET) control.

By the term polyethylene terephthalate as used in the composition of this invention, we mean not only the homopolymers of ethylene glycol and terephthalic acid but also copolymers wherein some of the ethylene glycol groups are replaced by other diol groups, e.g., diethylene glycol, and/or some of the terephthalic acid groups are replaced by other dicarboxylic acid groups, e.g., isophthalic acid, provided that the ethylene terephthalate groups form at least 70 mol percent of the polymer chain. The intrinsic viscosity of the polyethylene terephthalate is at least 0.35. The polyesters preferably have an intrinsic viscosity in dl./g. (measured in phenol tetrachloroethane, 1:1 by weight, at 25° C.) of between 0.38 and 1.50, advantageously between 0.45–1.10.

The polyester phase of this composition may also contain from 0.1 to 2.0% by weight of inorganic particulate filler of particle size 0.1 to 3μ as a nucleating agent, which has been found to promote crystallite growth by providing crystal initiation sites.

An important advantage of this invention is that whereas previously it has been necessary to use PET of intrinsic viscosity 0.6 or higher the high degree of effectiveness of the rubbery, terminally carboxylated olefin modified as set forth in the present invention allows use of PET of significantly lower intrinsice viscosity (0.4). Ordinarily, PET of intrinsic viscosity less than 0.6 is exceptionally brittle and of low impact strength. The addition of the dispersed phase as described herein provides for impact strength improvements of 20–100% and more, and thus allows use of PET of low specific viscosity which heretofore was considered unsuitable.

The olefinic phase of this invention to be suitable must satisfy the following requirements.

(1) It must have a glass transition temperature below 0° C. as can be measured by standard differential thermal analysis techniques.

(2) It must have a dynamic shear modulus no greater than $5 \times 10^9$ dynes/sq. cm. or 70,000 p.s.i., as measured at 20° C. by the torsion pendulum method using a frequency of about 1 c.p.s.

(3) It must be substantially insoluble in PET so as to form a discrete dispersed phase therein. In general, it may be said that if the (calculated) solubility parameter of the polymer or copolymer differs from that of PET by more than 0.2 it will be substantially insoluble therein. The solubility parameter can be calculated by the method described by Small in J. Appl. Chem. 3 (1953), p. 71.

The solubility parameter of PET is approximately 10.7, while saturated olefins such as polyethylene have a solubility parameter of 7.9 and unsaturated olefins such as polybutadiene have a solubility parameter of 8.1. Copolymers of ethylene will usually have solubility parameters greater than 8.0 but less than 10.2.

(4) It must be terminated at the chain ends with carboxylic acid groups, and must have a viscosity-average molecular weight of between 100,000 and 1,000,000.

The viscosity average molecular weight ($M_v$) is determined in a manner well-known to those skilled in the art. For polyethylene, for example, $M_v$ may be determined by experimentally measuring the intrinsic viscosity ($[\eta]$) in Decalin at 135° C. The following equation then relates $[\eta]$ to $M_v$:

$$[\eta] = 6.77 \times 10^{-4} M_v\ 0.67$$

Examples of polyolefins which satisfy the requirements listed above may be found among homopolymers as well as copolymers of polyethylene (high and low density), polypropylene, polyisobutylene, and random copolymers of ethylene with propylene, or with polypropylene and a nonconjugated diene. Chlorinated olefin products are also included in the category above, as are cross-linked olefins which can be carboxylated in the manner described herein. The foregoing categories include copolymers of ethylene with nonolefinic groups provided they meet the requirements outlined above.

Suitable olefinic copolymers which may be used include copolymers of ethylene with the following polymerizable compound which may be present in up to 70 mol percent of the copolymer:

(a) unsaturated carboxylic acids such as acrylic acid, methacrylic acid, maleic acid, fumaric acid, etc., or equivalently acid anhydrides such as maleic anhydride.

(b) esters of the above mentioned acids and saturated aliphatic alcohols, such as methanol, ethanol, etc.

(c) vinyl esters, as for example vinyl acetate, and the like.

With respect to olefinic copolymer, it is evident that the decomposition temperature of the copolymer must be above the processing temperature of the PET. In the case of an ethylene-vinyl acetate copolymer, for example, while it is known that polyvinyl acetate begins to decompose into acetic acid and unsaturated olefin at approximately 200° C., such a copolymer is nevertheless suitable for use in this invention since it has been shown that it would take several hours of exposure to temperatures over 200° C. to decompose any substantial amount of polymer, see for example E. Fettes, Chem. React. of Polymer, Interscience, New York, 1964. Since normal processing times are usually on the order of 2–10 minutes, decomposition of this copolymer would not be an adverse or limiting factor.

Figure 11:
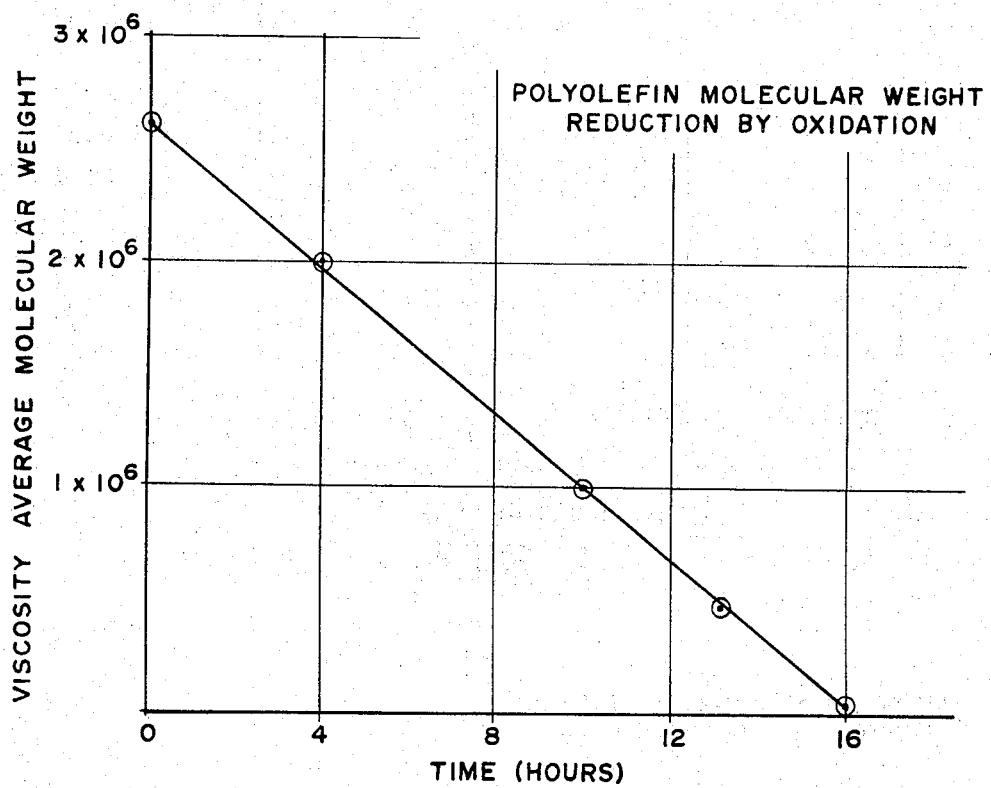
FIG. 11 depicts the reduction in molecular weight obtained when polyethylene of initial molecular weight ($M_v$) 2.6 million is oxidized by an air stream kept at 230° F. The temperature of the polyethylene particles is 260° F. After 4 hours at the above conditions, the $M_v$ is reduced to approximately 2.0 million. After 16 hours at the above conditions, the $M_v$ is reduced to approximately 53,000.

I have found that a convenient method of preparation of the carboxyl-terminated polyethylene phase is to essentially "degrade" high molecular weight polyethylene or polyethylene copolymers in the presence of air or oxygen, at an elevated temperature, so as to reduce the molecular weight and introduce carboxylic acid groups at the points of chain scission. Such a reaction is often called autooxidation, since catalysts are not required for reaction. Polyethylene having a molecular weight of from about 100,000 to about 1,000,000 and a specific gravity of from about 0.91 to about 0.965 may be advantageously used. For example, polyethylene of specific gravity .94, particle size 150μ (100 mesh) and original viscosity average molecular weight $2.6 \times 10^6$ was stirred constantly and heated to 260° F. Constant stirring prevents fusion of the polymer particles to each other and to the containing vessels and equipment. An air stream heated to 230° F. was then passed through the particles. If sufficient agitation of the particles is not obtainable, the hot air (or oxygen) stream can be bubbled through the powdered polyethylene. As FIG. 11 shows, under these conditions the $M_v$ decreases linearly with time. After 4 hours, the $M_v$ has been reduced to $2.0 \times 10^6$, and after 13 hours, the $M_v$ has been reduced to 500,000 and after 16 hours the $M_v$ is reduced to approximately 60,000 as is determined by dilute solution viscometry techniques. Similar autooxidative or degradative reactions occur with ethylene copolymers.

The presence of the carboxylic end groups can be verified and quantified if desired by infrared spectroscopy, or by wet analysis (titration) techniques. Ordinarily, carboxylic acid groups are introduced at each point of chain scission, and so every molecule will have at least one carboxylic end group and at low final $M_v$, every molecule will have essentially 2 carboxylic end groups. This oxidative procedure can be carried out in the presence of PET particles or pellets, but preferably the PET is blended with the oxidized polyethylene after treatment of the polyethylene. The oxidized polyethylene, of $M_v$ $1.0 \times 10^6$ to 100,000, is added to the PET so that the weight percent of polyolefin is 0.1 to 30% preferably from 0.5 to 25%. The compositions of the present invention may be prepared by any conventional blending technique under conditions which are normally used to process PET alone. This also applies if a third component, e.g., glass fiber, particulate filler, or the like, is incorporated into the mixture.

If copolymers of ethylene are used as the dispersed phase, the oxidative procedure may necessitate lower reaction temperatures, the maximum desirable temperature being one below which polymer fusing, crosslinking, or total degradation occurs.

Preferably the average size of the dispersed olefinic particles in the shaped article is 20 microns or less, and preferably above 0.02 micron, since these useful improvements in impact strength are then obtained. Control of the dispersed particle size may be achieved by variation of the extent of shear impacted to the mixture, by changing processing temperatures or times or by changing other processing parameters.

The advantageous results of the invention may be obtained whether the PET matrix in the shaped article is in crystalline or amorphous form, although in general it is preferable to have the matrix crystalline. Crystalline PET may be obtained by several techniques, for example, such as one of the following:

(1) Addition of a heterogeneous nucleating agent, such as talc of size 2 microns or less to the PET in percentage of from 0.01 to 2.0% by weight, to promote crystallization of the PET and to reduce crystallization time.

(2) The article may be shaped in a mold heated to 110–150° C. Residence times in the mold of 5 to 100 seconds, depending upon part geometry, are usually sufficient to crystallize the PET.

(3) The article formed from PET may be heat treated at temperatures of 110–190° C. for a suitable length of time after shaping.

(4) The article may be formed from a crystalline PET sheet or object which is heated for several seconds to not more than 10° C. above the melting point of PET, and then shaped by stamping, vacuum forming, etc. The residual crystallites promote crystallite growth and act as homogeneous nucleating agents.

It will be understood that two or more of the above techniques may be used in combination to promote crystallization of the PET phase.

The blend of oxidized α-olefin and PET can in addition be blended with from 2 to 70%, and preferably from 5 to 60% of fibrous and/or particulate filler or reinforcement. Suitable fibers include glass fibers, carbon fibers, asbestos, metal fibers, etc. Suitable particulate fillers include powdered metals, metal hydroxides or oxides, silicates, clays, the various forms of silica or quartz, lime or limestone, etc. The fibrous or particulate material may in addition be treated with suitable finishing or coupling agents or adhesion promoters as is known to those skilled in the art.

The exact mechanism by which the improved impact properties of the composition of the invention are derived is not known with certainty. It has been observed, however, that the solubility parameter of the carboxyl terminated polyethylene or carboxyl terminated polyethylene copolymer (or unmodified polyethylene copolymer) is virtually unchanged from that of unmodified polyethylene, since the carboxyl groups are such a small molar percentage of the total polymer chain. Intermolecular hydrogen bonding or dipole interaction between the relatively polar polyethylene chain ends (carboxyl groups) and the ester linkages of the PET molecule are possible. Such secondary bonds between the polyethylene chain ends and the carboxyl or hydroxyl PET chain ends are also possible as is direct reaction between these end groups. As a further possibility, ester interchange between an ester group and the terminal carboxyl group is possible, since such interchange reactions have been recognized as readily occurring in polycondensation reaction products. In the case of ethylene copolymers, there is the further possibility that the copolymerized moiety may further increase the secondary bonding and/or reaction possibilitties yielding improved compatibility. Also, in this case, the solubility parameter may be somewhat closer to that of PET. Whatever the mechanism of compatibility and impact strength improvement, the examples demonstrate that the compositions prepared in accordance with the invention exhibit a significant impact strength improvement over compositions heretofore known in the prior art.

The following examples, in which parts as percentages employed are by weight unless otherwise indicated, will further illustrate the invention.

Example 1

PET of intrinsic viscosity 0.68 is melt blended with two forms of polyethylene to compare the effect on the dispersibility and on the stability of the dispersion of the oxidative treatment as previously described. Results are compared on the basis of photomicrographs which show the stability under higher temperature exposure of the dispersed, olefinic phase.

All samples, including the control, are blended in a Brabender Plasticorder at a melt temperature of 280° C., the standard processing temperature for PET. The residence time in the chamber at this temperature is 6 minutes. The indicated r.p.m. of the slower rotor is 100 r.p.m., which corresponds very roughly to an average shear rate in the mixing chamber of 95 sec.$^{-1}$ (see J. E. Goodrich and R. S. Porter, Polym. Eng. and Sci., vol. 7, No. 1, January 1967).

The photograph of FIG. 1 is of the PET control. The linear markings are a result of the cutting and polishing procedure which is used in preparation of the specimens for microphotography.

Figure 2:
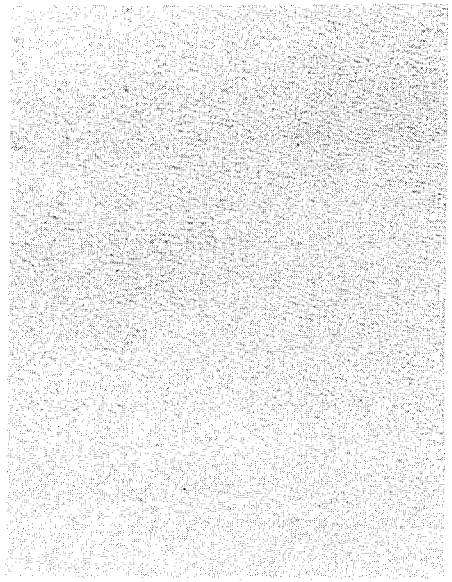
FIG. 2 is a photomicrograph (at the same magnification) of a composition comprising polyester (PET) plus 10 weight percent polyethylene of viscosity average molecular weight ($M_v$) 100,000 after melt blending for 5 minutes in the Brabender blender.

Photomicrograph of FIG. 2 is of PET containing 10% by weight of polyethylene of weight average molecular weight 100,000. The average particle size of the dispersed phase is seen to be approximately 2 microns ($\mu$) with a dispersed particle size range of 1.0–2.5$\mu$. The mixture is homogeneous and well-blended.

Figure 3:
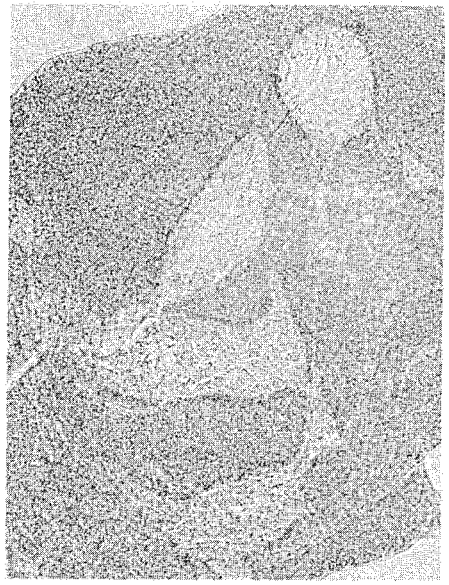
FIG. 3 is the photomicrograph of the composition of FIG. 2 after heating to 290° C. for 5 minutes.

FIG. 3 is of the mixture of FIG. 2 after being heated at 290° C. for 5 minutes. It can be seen that the dispersed polyethylene particles have coalesced and segregated into larger regions within the PET matrix. The dispersed particle size is now approximately 36–44$\mu$ in diameter.

Figure 4:
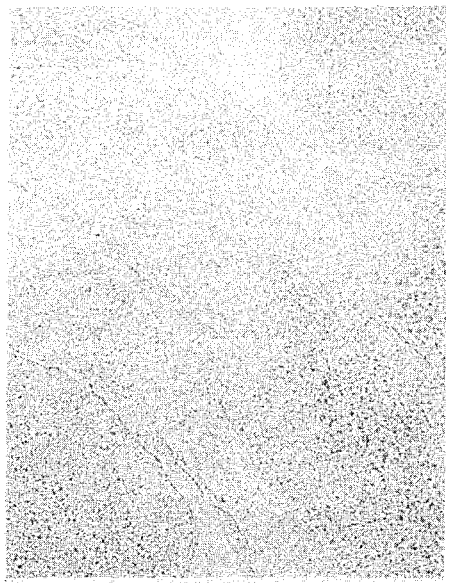
FIGS. 4 and 5 are the photomicrographs of the composition of FIG. 2, after heating to 290° C. for 10 and 15 minutes, respectively.

FIG. 4 is of the mixture of FIG. 2 after being heated at 290° C. for 10 minutes. The dispersed particles are now on the order of 40$\mu$ or more in diameter.

Figure 5:
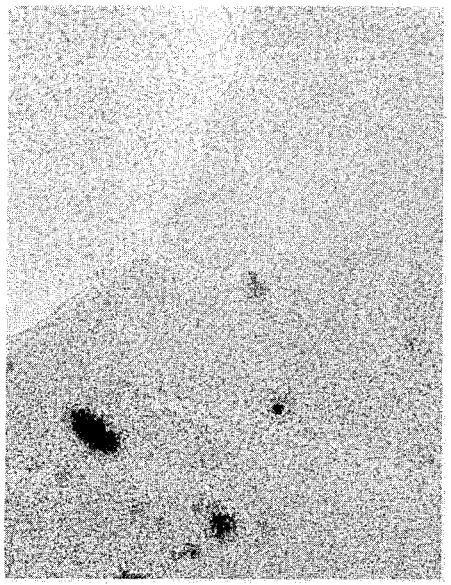

FIG. 5 is of the mixture of FIG. 2 after being heated at 290° C. for 15 minutes. The dispersed particles are now larger than 45$\mu$ in diameter.

Figure 6:
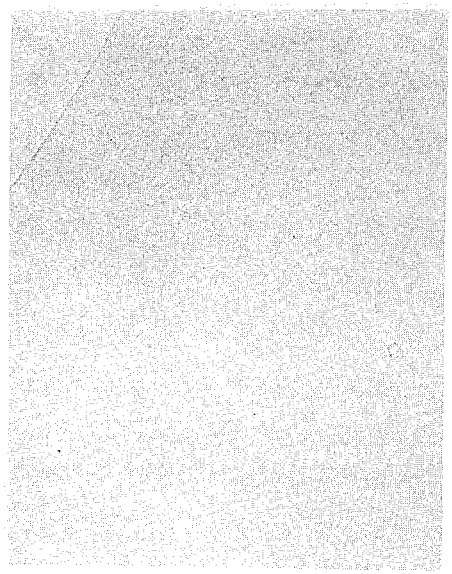
FIG. 6 is the photomicrograph (at the same magnification) of a composition comprising polyester (PET) plus 10 weight percent of oxidized polyethylene, prepared according to the procedure to be described herein, of $M_v$ 60,000, after melt blending for 5 minutes in the Brabender blender.
Figure 7:
FIGS. 7, 8 and 9 are the photomicrographs (at the same magnification) of the composition of FIG. 6 after heating to 290° C. for 5, 10, and 15 minutes respectively.
Figure 8:
Figure 9:
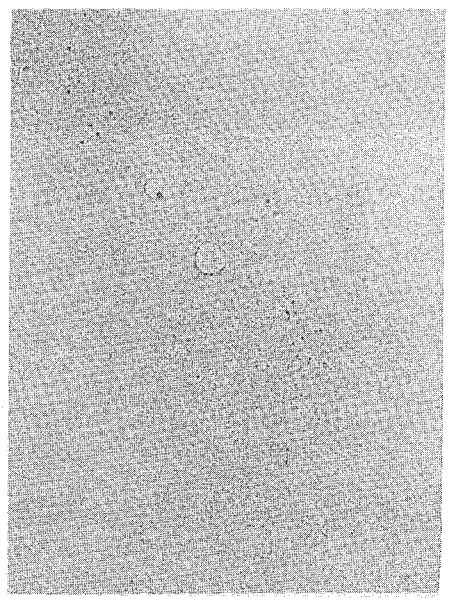

FIG. 6 is polyethylene containing 10% by weight of oxidized polyethylene, which has been prepared according to the described procedure. The viscosity average molecular weight of the polyolefin is approximately 60,000. FIGS. 7, 8, and 9 show the composition of FIG. 6 after heating at 290° C. for times of 5, 10, and 15 minutes, respectively. The average dispersed particle size in FIG. 6 is approximately 1.5$\mu$, with a particle size range of from 0.5 to 2.0$\mu$, similar to the particle size range in FIG. 2. The average dispersed particle size range in FIG. 7 is from 0.5 to 3.0$\mu$. After 10 minutes heating, FIG. 8 shows the particle size range being from 1.0 to 10.0$\mu$. After 15 minutes at 290° C., FIG. 9 shows that the dispersed particles are still between 1.0$\mu$ to 10.0$\mu$ in diameter.

Figure 10:
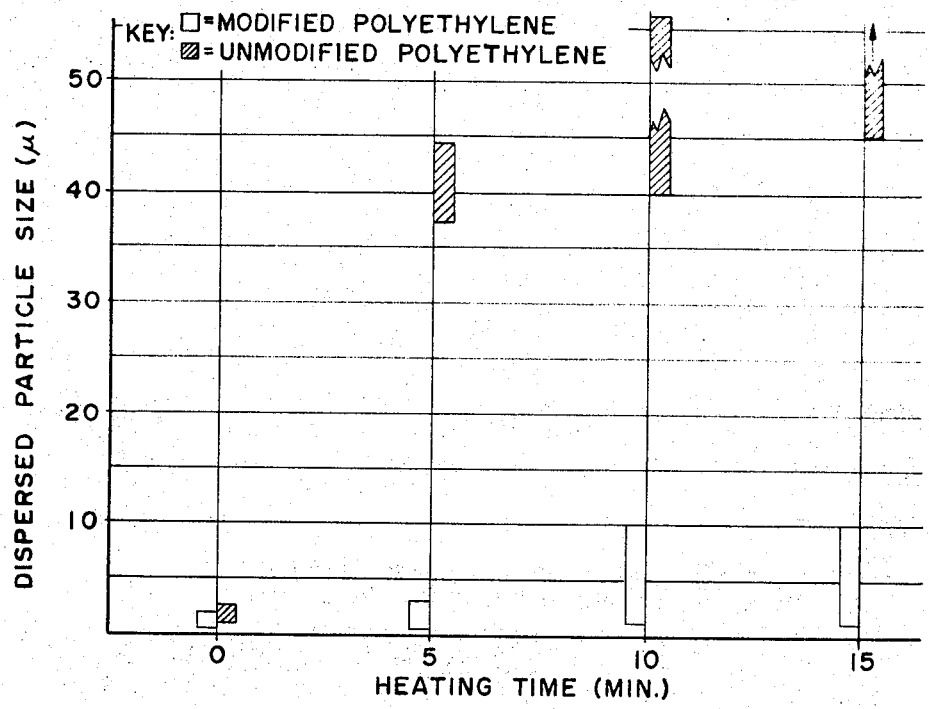
FIG. 10 describes graphically the coalescence of the dispersed polyethylene phases (in FIGS. 2–9) upon heating at 290° C. It is seen from this figure that after 5 minutes or longer at 290° C., the size of the dispersed polyethylene particles is much larger in the case of the unmodified polyethylene than in the case of polyethylene which has been oxidized according to the procedure described.

The relationships observed in the two sets of photomicrographs, FIGS. 2–5 and FIGS. 6–10, are put into a graphical form in FIG. 10. This figure shows that although the initial dispersed polyolefin phases (i.e., at heating time 0 minutes) are of similar particle sizes, heating at an elevated temperature segregates and coalesces the unmodified polyolefin phase into farily large sized particles. On the other hand, identical heat treatment of the oxidized polyethylene phase serves to inhibit coalescence of this phase in PET. Even after 15 minutes at 290° C., the dispersed polyolefin phase is below 10.0$\mu$ in (average) diameter.

It should be evident that a similar marked improvement in dispersion stability will be obtained with polyethylene co-polymers as described herein after oxidation of the polyethylene portion of such polymers.

Example 2

(a) A mixture of 70% by weight PET of intrinsic viscosity 0.46 and 30% glass fiber reinforcement is injection molded at a barrel temperature of approximately 275° C. and a mold temperature of 140° C. into standard test specimens (Specimens 2–A).

(b) A second mixture (2–B) containing 66.5% by weight PET, 3.5% by weight carboxylated (oxidized) polyethylene, and 30% by weight glass fibers, is injection molded under identical conditions. The $\alpha$-olefin phase thus accounted for 5% of the total polymer phase. The carboxylated polyethylene is oxidized for 10 hours under the controlled conditions as previously described, and was of final $M_v$ 1.0×10$^6$. The molded test bars were tested, and the results are presented in Table I.

TABLE I

|  | 2-A | 2-B |
|---|---|---|
| Tensile str. (p.s.i.) | 13,000 | 14,000 |
| Flexural str. (p.s.i.) | 15,000 | 16,800 |
| Flexural modulus (p.s.i.×10$^{-6}$) | 1.10 | 1.0 |
| Notch Izod impact str. (ft.-lb./in.) | 1.0 | 1.5 |
| Unnotched Izod impact str. (ft.-lb./in.) | 3.5 | 5.6 |

All mechanical tests in the above table are ASTM tests except for the unnotched Izod test, which was performed in a manner identical to the notched Izod tests, and upon the same size samples, except that the samples were not notched. It is noted from Table I that significant improvements in the impact strength are achieved in samples 2–B, as compared to the unmodified samples 2–A. The tensile and flexural strengths are also increased slightly, and the flexural modulus has decreased slightly, as would be expected from the true dispersion reinforcement of a glassy material by a low $T_g$ rubbery phase. The particle size of the dispersed phase was measured at approximately 1.0 micron by electron microscopy techniques, as is known to those skilled in the art.

Example 3

(a) The procedure of Example 2 is repeated, except that the intrinsic viscosity of the PET is 0.90. Specimens 3–A contained 30% glass fiber reinforcement and 70% PET.

(b) Specimens 2–B are modified so that 5% of the polymer phase is carboxylated polyethylene, as in Example 2. Results are presented in Table II.

TABLE II

|  | 3-A | 3-B |
|---|---|---|
| Tensile str. (p.s.i.) | 19,500 | 20,400 |
| Flexural str. (p.s.i.) | 27,000 | 28,200 |
| Flex. modulus (p.s.i.×10$^{-6}$) | 1.45 | 1.39 |
| Notched Izod impact str. (ft.-lb./in. notch) | 1.8 | 3.0 |
| Unnotched Izod impact str. (ft.-lb./in.) | 6.7 | 7.8 |

In general, similar results are presented in Table II as in Table I, although all strength values are considerably higher because of the higher intrinsic viscosity of the PET used in Example 3.

Example 4

(a) PET pellets of intrinsic viscosity 0.40 and 2″ long glass fibers are randomly distributed and compression molded so as to yield a 15″ square plaque ⅛″ thick containing 28% by weight glass fibers. This plaque is then re-heated in an infrared oven for 2 minutes to above the melting temperature of the PET (280–290° C.), and transferred to a stamping press where a cylindrical cup 9″ in diameter and 3″ deep was "hot-stamped" in a cold mold, i.e. a matched metal mold maintained at room temperature. The cup so obtained is then maintained at 150° C. for two hours to totally crystallize the PET. It should be noted that the transfer step in which the heated plaque was transferred from the infrared oven to the stamping press is feasible because the 2″-long glass fibers retained the sheet integrity during this step. If short e.g. ¼″ to ½″ long, fibers are used, such a transfer step would not be possible since the composite sheet virtually disintegrates during the transfer step. Test samples are cut out of the cup bottom and are designated specimens 4–A.

(b) The same procedure as outlined above was repeated, except that the PET is pre-blended in an extruder with 3% by weight of polyethylene oxidized as described previously, and of $M_v$ 500,000. The final composition of the test specimens is 69.9% PET, 2.1% polyethylene and 28% 2″-long glass fibers. The size of the dispersed polyethylene in the final test specimens (4–B) ranged from 0.6 to 0.8 micron. During the 2 minute pre-heat step, no segregation of the dispersed polyethylene phase was observed. As was shown in Example 2, after several minutes at 290° C. unmodified polyethylene may be expected to segregate into large islands inside the PET matrix, while oxidized and carboxylated polyethylene would not coalesce in this manner. Test results are presented in Table III below.

TABLE III

|  | 4-A | 4-B |
|---|---|---|
| Tensile str. (p.s.i.) | 11,500 | 15,800 |
| Flexural str. (p.s.i.) | 21,000 | 22,500 |
| Flex. modulus (p.s.i.×10⁻⁶) | 1.07 | 0.98 |
| Notched Izod impact str. (ft.-lb./in. notch) | 5.2 | 7.3 |
| Unnotched Izod impact str. (ft.-lb./in.) | 9.0 | 10.6 |
| Broadface impact str. (ft.-lb./in.) | 8.4 | 9.5 |

All tests are ASTM standard tests except the unnotched Izod strength test, which was mentioned in Examples 2 and 3 above, and the Broadface impact test, which is performed in the same manner as the unnotched Izod test, and upon the same size specimens, except that the specimen is rotated 90° in the testing jog so that impact is upon the wider face of the sample.

The results of Table III indicate that impact strength increases of up to approximately 40%, as measured by the tests listed have been achieved in sample 4-B as compared to sample 4-A. Furthermore, substantial increases in tensile and flexural strength are also obtained. It should be noted that the impact strengths of Table III are significantly higher than those of Tables I and II which is attributable to the long glass-fiber reinforcement present. The shaping technique, or "hot-stamping," as described in this example is necessary in order to retain these long fiber lengths, since more common processing techniques such as extrusion or injection molding would break up all the long fibers into much shorter lengths. In the hot-stamping technique, fibrous reinforcement of length 2″ or longer, including random glass mat, glass fabric, needled mat, etc., are suitable modes of reinforcement.

Example 5

(a) PET of intrinsic viscosity 0.55 was dry blended with particulate silica (novaculite) so as to form a composition consisting of 57.1% by weight of silica (novaculite). The mean particle size of the silica was 5.0 microns. This mixture is then extruded and pelletized. The pellets are dried at 100° C. for 4 hours to remove all adsorbed moisture, and is then distributed in a compression mold along with 2″-long glass fibers so that the final mixture contained 30% by weight glass fibers. The weight percent of each component in the final plaque is 30% PET, 40% silica, 30% glass fibers. The compression molded plaque is then heated to the melting point of the PET in an ambient temperature, and stamped into a shaped cup as described in Example 4. Test specimens are cut from this cup and crystallized as described previously at 170° C. for 3 hours. These specimens are listed as 5-A in Table IV.

The above procedure is repeated except that prior to melt blending the PET and silica, 10% by total weight of polymer of oxidized poly(ethylene-vinyl acetate) copolymer was added to the mixture. The final composition of the test specimens was therefore 27% PET, 3% polyethylene, 40% silica, and 30% glass fibers. The molding, shaping and testing procedure outlined for samples 5-A were repeated for these samples (5-B), and the results are compared in Table IV.

The ethylene-vinyl acetate copolymer contained approximately 20% by weight of vinyl acetate, and had a melt index of 500 (g./10 min.) as measured according to ASTM D1238, modified.

TABLE IV

|  | 5-A | 5-B |
|---|---|---|
| Tensile str. (p.s.i.) | 11,600 | 12,600 |
| Flexural str. (p.s.i.) | 20,300 | 23,000 |
| Flexural modulus (p.s.i.×10⁻⁶) | 1.60 | 1.48 |
| Notched Izod impact str. (ft.-lb./notch) | 4.7 | 6.2 |
| Unnotched Izod impact str. (ft.-lb./in.) | 8.0 | 10.4 |
| Broadface impact str. (ft.-lb./in.) | 7.2 | 8.9 |

Impact strength improvements on the order of 25% or more are achieved by all three methods of measurement. Corresponding increases in flexural and tensile strengths are also noted again, as is the small change in flexural modulus.

Example 6

(a) PET of intrinsic viscosity 0.7 is injection molded into plaques which were then cut into impact test specimens (sample 6-A).

(b) Identical PET is dry blended with 15% by total weight of oxidized polyethylene of $M_v$ 200,000 and then injection molded and cut into test specimens (sample 6-B). Results are presented in Table V.

TABLE V

|  | 6-A | 6-B |
|---|---|---|
| Notched Izod impact str. (ft.-lb./in. notch) | 0.25 | 0.6 |
| Unnotched Izod impact str. (ft.-lb./in.) | 1.2 | 2.7 |

The notched impact strength of sample 6-B is over 100% greater than of sample 6-A. The unnotched strength is similarly over 100% improved upon the addition of the oxidized, carboxylated polyethylene. The particle size of the dispersed α-olefin phase was measured at 0.2 to 0.5 micron.

Various modifications apparent to those skilled in the art may be made without departing from the scope or spirit of the invention. Such modification, except as precluded by the claims, is within the purview of the invention.

I claim:

1. A thermoplastic molding composition consisting essentially of an intimate dispersion of
   (a) from about 25 percent to 95 percent by weight of polyethylene terephthalate;
   (b) from about 2 percent to about 70 percent by weight of a filler; and
   (c) as an impact modified from about 0.5 percent to about 30 percent by weight of an oxidized and carboxylated polyolefin which has a solubility parameter differing from the solubility parameter of said polyethylene terephthalate by at least 0.2.

2. The molding composition of claim 1 wherein the polyolefin is polyethylene.

3. The molding composition of claim 1 wherein the polyolefin is a copolymer of ethylene containing at least 30 mol percent polyethylene.

4. The molding composition of claim 1 wherein the polyolefin is polyethylene having a molecular weight of from about 100,000 to about 1,000,000 and a specific gravity of from about 0.91 to about 0.965.

5. The composition of claim 1 wherein the filler includes glass fiber having a length of at least 2 inches.

6. The composition of claim 1 in the form of a sheet product capable of being formed into shaped articles by a stamping press and being characterized by having no coalescence of the dispersed phase.

7. The composition of claim 1 in which the intrinsic viscosity of the polyethylene terephthalate is at least 0.35.

8. A method for producing an impact resistant polyethylene terephthalate product which comprises injection molding a molten composition consisting essentially of an intimate dispersion of
   (a) polyethylene terephthalate in which there has been blended and dispersed
   (b) from 0.5 to 30 percent by weight based on the weight of polyethylene terephthalate of a finely divided oxidized and carboxylated polyolefin having a molecular weight of from 100,000 to 1,000,000 as measured by intrinsic viscosity measurements.

9. The process of claim 8 in which the composition of the injection molded articles is subsequently crystallized by heat setting at a temperature of from 100° C. to 185° C.

10. A method for producing an impact resistant polyethylene terephthalate product which comprises forming a sheet product consisting essentially of an intimate dispersion of
   (a) polyethylene terephthalate in which there has been blended and dispersed
   (b) from 0.5 to 30 percent by weight based on the weight of polyethylene terephthalate of a finely divided oxidized and carboxylated polyolefin having a molecular weight of from 100,000 to 1,000,000 as measured by intrinsic viscosity measurement and at least 5 percent by weight of glass fiber having a length of at least 2 inches and forming shaped product by preheating the sheet and stamping the sheet in a stamping apparatus.

References Cited

UNITED STATES PATENTS

| | | | |
|---|---|---|---|
| 3,562,200 | 2/1971 | Jones et al. | 260—40 R |
| 3,534,120 | 10/1970 | Ando et al. | 260—873 |
| 3,575,931 | 4/1971 | Sherman | 260—28 |
| 3,361,848 | 1/1968 | Siggel et al. | 260—873 |
| 3,405,198 | 10/1968 | Rein et al. | 260—873 |
| 3,580,965 | 5/1971 | Brinkman et al. | 260—873 |

OTHER REFERENCES

Owens-Corning, "Textile Fiber Materials for Industry," Pub. No. 1–GT–1375–C (February 1964), page 33.

Def. Publ. T870,004, published Jan. 6, 1970.

MORRIS LIEBMAN, Primary Examiner

S. M. PERSON, Assistant Examiner

U.S. Cl. X.R.

260—873